US012588969B2

(12) United States Patent
De Clerck

(10) Patent No.: US 12,588,969 B2
(45) Date of Patent: Mar. 31, 2026

(54) BONE ANCHOR FOR AN UPPER OR LOWER JAW WITH A CORRESPONDING DRILLING TEMPLATE

(71) Applicant: TITA-LINK B.V., Brussels (BE)

(72) Inventor: Hugo De Clerck, Tervuren (BE)

(73) Assignee: TITA-LINK B.V., Brussels (BE)

( * ) Notice: Subject to any disclaimer, the term of this patent is extended or adjusted under 35 U.S.C. 154(b) by 371 days.

(21) Appl. No.: 17/283,788

(22) PCT Filed: Oct. 8, 2019

(86) PCT No.: PCT/IB2019/058555
§ 371 (c)(1),
(2) Date: Apr. 8, 2021

(87) PCT Pub. No.: WO2020/075065
PCT Pub. Date: Apr. 16, 2020

(65) Prior Publication Data
US 2021/0378787 A1 Dec. 9, 2021

(30) Foreign Application Priority Data
Oct. 8, 2018 (BE) .................................... 2018/0124

(51) Int. Cl.
*A61C 1/08* (2006.01)
*A61C 13/00* (2006.01)

(52) U.S. Cl.
CPC .......... *A61C 1/084* (2013.01); *A61C 13/0004* (2013.01)

(58) Field of Classification Search
CPC ............................ A61C 1/084; A61C 13/0004
See application file for complete search history.

(56) References Cited

U.S. PATENT DOCUMENTS

| | | | | |
|---|---|---|---|---|
| 5,373,860 A | * | 12/1994 | Catone | A61B 17/8863 |
| | | | | 264/222 |
| 5,690,631 A | * | 11/1997 | Duncan | A61B 17/8085 |
| | | | | 606/284 |
| 5,853,291 A | * | 12/1998 | DeVincenzo | A61C 8/0031 |
| | | | | 433/176 |

(Continued)

FOREIGN PATENT DOCUMENTS

| | | | | |
|---|---|---|---|---|
| WO | 02/091942 A1 | 11/2002 | | |
| WO | 2016/034973 A1 | 3/2016 | | |
| WO | WO-2016181286 A1 | * | 11/2016 | ......... A61B 17/1673 |

OTHER PUBLICATIONS

Jan Hour Far et al., "Fully customized placement of orthodontic miniplates: a novel clinical technique" Head & Face Medi Cine, Biomed Central, London, GB, vol. 10, No. 1, May 3, 2014 pp. 1-7.

*Primary Examiner* — Eric J Rosen
*Assistant Examiner* — Hao D Mai
(74) *Attorney, Agent, or Firm* — FISHERBROYLES, LLP; Roger L. Browdy; Ronni S. Jillions

(57) ABSTRACT

Bone anchor for an upper or lower jaw and a corresponding drilling template for making drill holes in the jaw. The drilling template contains an anchor plate and a connecting element whose shape and dimensions are substantially the same as those of the anchor plate and the connecting element of the bone anchor. A drill guide is provided adjacent to recesses on the drilling template that allows a drill to be appropriately guided in order to make drill holes in the jaw.

11 Claims, 4 Drawing Sheets

(56)　　　　　　References Cited

U.S. PATENT DOCUMENTS

| | | | | |
|---|---|---|---|---|
| 6,193,509 | B1 * | 2/2001 | DeVincenzo | .......... A61C 7/282 |
| | | | | 433/18 |
| 6,827,574 | B2 * | 12/2004 | Payton | ..................... A61C 7/00 |
| | | | | 433/18 |
| 2005/0182408 | A1 * | 8/2005 | Pfefferle | ............ A61B 17/8085 |
| | | | | 606/285 |
| 2006/0235408 | A1 * | 10/2006 | Wang | ................... A61B 17/663 |
| | | | | 606/283 |
| 2007/0043370 | A1 * | 2/2007 | Ueda | ................... A61B 17/663 |
| | | | | 606/71 |
| 2008/0081315 | A1 * | 4/2008 | Kim | ................... A61B 17/8071 |
| | | | | 433/173 |
| 2011/0269100 | A1 * | 11/2011 | Furrer | ................ A61B 17/8061 |
| | | | | 433/173 |
| 2011/0301609 | A1 * | 12/2011 | Longepied | ......... A61B 17/8071 |
| | | | | 606/281 |
| 2012/0022604 | A1 * | 1/2012 | Polley | ................. A61B 17/176 |
| | | | | 606/86 R |
| 2014/0149095 | A1 * | 5/2014 | Davison | ............ A61B 17/1739 |
| | | | | 703/7 |
| 2016/0374778 | A1 * | 12/2016 | Grobbee | ................ A61C 13/01 |
| | | | | 433/74 |
| 2020/0205947 | A1 * | 7/2020 | Grobbee | ........... A61C 13/1009 |

* cited by examiner

BONE ANCHOR FOR AN UPPER OR LOWER JAW WITH A CORRESPONDING DRILLING TEMPLATE

The invention concerns a bone anchor for an upper or lower jaw and a corresponding drilling template for providing boreholes in the jaw to mount the bone anchor to the bone of the jaw by means of screws. This bone anchor contains an anchor plate with openings for said screws, a mounting device for mounting auxiliary means and an elongated connecting element which extends between the mounting device and the anchor plate. The connecting element is rigidly connected to the anchor plate and should extend through gingiva or mucosa into the oral cavity so that the mounting device is located in the oral cavity. The anchor plate has a bone side, which has to be connected to said bone of the jaw, and an opposite free side.

The drilling template has recesses whose mutual position corresponds to the mutual position of the aforementioned openings in the bone anchor. On each of said recesses in the drilling template, a drill guide is attached which allows a drill to be correctly guided through the drill guide and through the corresponding recess in order to make said holes in the jaw.

According to the current state of the art, in order to prepare the jaw for placing a bone anchor, a drilling template is placed against the jaw. This drilling template is used to guide a drill in boreholes in predetermined positions in the jaw. After the removal of the drilling template, the bone anchor is fixed to the jaw with screws, which screws are secured in said boreholes.

Such bone anchors are, for example, attached to the upper jaw against the bone on or near the transition between the maxilla and the arcus zygomaticus. Taking into account the presence of muscle and other tissues, the space to place a drilling template there in the oral cavity is very limited. In particular, it is difficult to place the drilling template against the jaw bone in a correct position, which has been determined beforehand. Even if the drilling template is correctly positioned, it is still difficult to keep the template in a correct position while drilling. In addition, the space in the oral cavity is relatively small to easily handle a drilling instrument in the oral cavity to make the desired boreholes in the bone.

The invention aims to remedy these disadvantages by proposing a drilling template that allows boreholes to be made in a jaw for mounting the corresponding bone anchor, whereby this drilling template can be easily positioned in a correct position within the limited space available in the oral cavity. In addition, the invention proposes a drilling template that can be designed in an extremely simple way at a relatively low cost.

To this aim, the drilling template according to the invention comprises an anchor plate with a bone side of which at least the shape and dimensions are substantially identical to those of the bone side of the bone anchor's anchor plate. The drilling template also has a connecting element which is rigidly connected to the anchor plate of the drilling template and whose shape and dimensions are substantially identical to those of the connecting element of the bone anchor, wherein a drill guide is provided adjacent to each of said recesses of the drilling template, which allows to correctly guide a drill in order to make boreholes in the jaw.

Practically, said connecting element of the drilling template has the same orientation and position in relation to the anchor plate of the drilling template as the connecting element of the bone anchor in relation to the anchor plate of the drilling template.

Advantageously, one end of the connection element of the drilling template, which is opposite to the end connected to the drill template's anchor plate, exhibits a reference device whose shape and dimensions are substantially identical to those of said mounting device, wherein the relative position of the reference device in relation to the drilling template's anchor plate corresponds to the relative position of the mounting device in relation to the bone anchor's anchor plate.

According to an interesting embodiment of the invention, said drill guides are removable from said drilling template in order to transform the latter into said bone anchor.

The invention also relates to a method for manufacturing at least one bone anchor and a corresponding drilling template for an upper or lower jaw, wherein the bone anchor has an anchor plate which must be fixed to the surface of the bone of the jaw concerned with one or several screws. The anchor plate of the bone anchor has a bone side which must join the surface of the bone and a free side opposite said bone side. Furthermore, this bone anchor has an elongated connecting element that extends between a mounting device and the anchor plate and is rigidly connected to the latter. This connecting element should extend through gingiva or mucosa into the oral cavity so that the mounting device is located in the oral cavity.

In the method according to the invention, a model of the bone anchor is designed starting from a three-dimensional digital model of the bone of the jaw and, based on this model of the jaw, a position and orientation for each of said one or more screws is chosen as a function of the structure and density of the bone. Thus, a borehole with a borehole axis is defined for these screws, and corresponding openings for these screws are provided in the bone anchor model.

This method is characterised in that said drilling template is designed on the basis of the model of said bone anchor to which drill guides are added that have a cylindrical recess with a central axis that coincides with said borehole axis for guiding a drill.

The bone anchor and/or the drilling template are then, preferably, manufactured from, for example, titanium by means of an additive manufacturing technique.

Other particularities and advantages of the invention will become clear from the following description of some specific embodiments of the bone anchor and the associated drilling template and of the method of manufacturing them according to the invention. This description is given as an example only and does not limit the scope of the protection claimed in any way; the reference numbers used below refer to the attached figures.

In the different figures, the same reference numbers refer to the same or similar elements.

The invention generally concerns a bone anchor and a drilling template belonging to this bone anchor. The drilling template makes it possible to provide boreholes in the jaw in predetermined positions and according to predetermined orientations so that the bone anchor can be attached to the jaw in a predetermined position with screws that thus extend into the jaw bone according to a predetermined orientation.

Such a bone anchor is already known as such to the professional and has a mounting device that must extend into the oral cavity and to which orthodontic or orthopaedic aids can be mounted.

In recent applications of such bone anchors, they have to absorb relatively large forces. This is the case, for example, when they are used to move a lower jaw in relation to an upper jaw, where relatively large loads are applied to the bone anchors.

In order to secure the bone anchors as firmly as possible to the jaw, they must be designed individually for each patient, ensuring that the anchor plate of a bone anchor can fit almost flush with the surface of the jaw bone. The bone anchor is attached to the jaw with screws. This also means that an orientation and position is chosen for these screws in such a way that they extend into as firm a bone as possible.

Figures 4, 5, 6, 7:
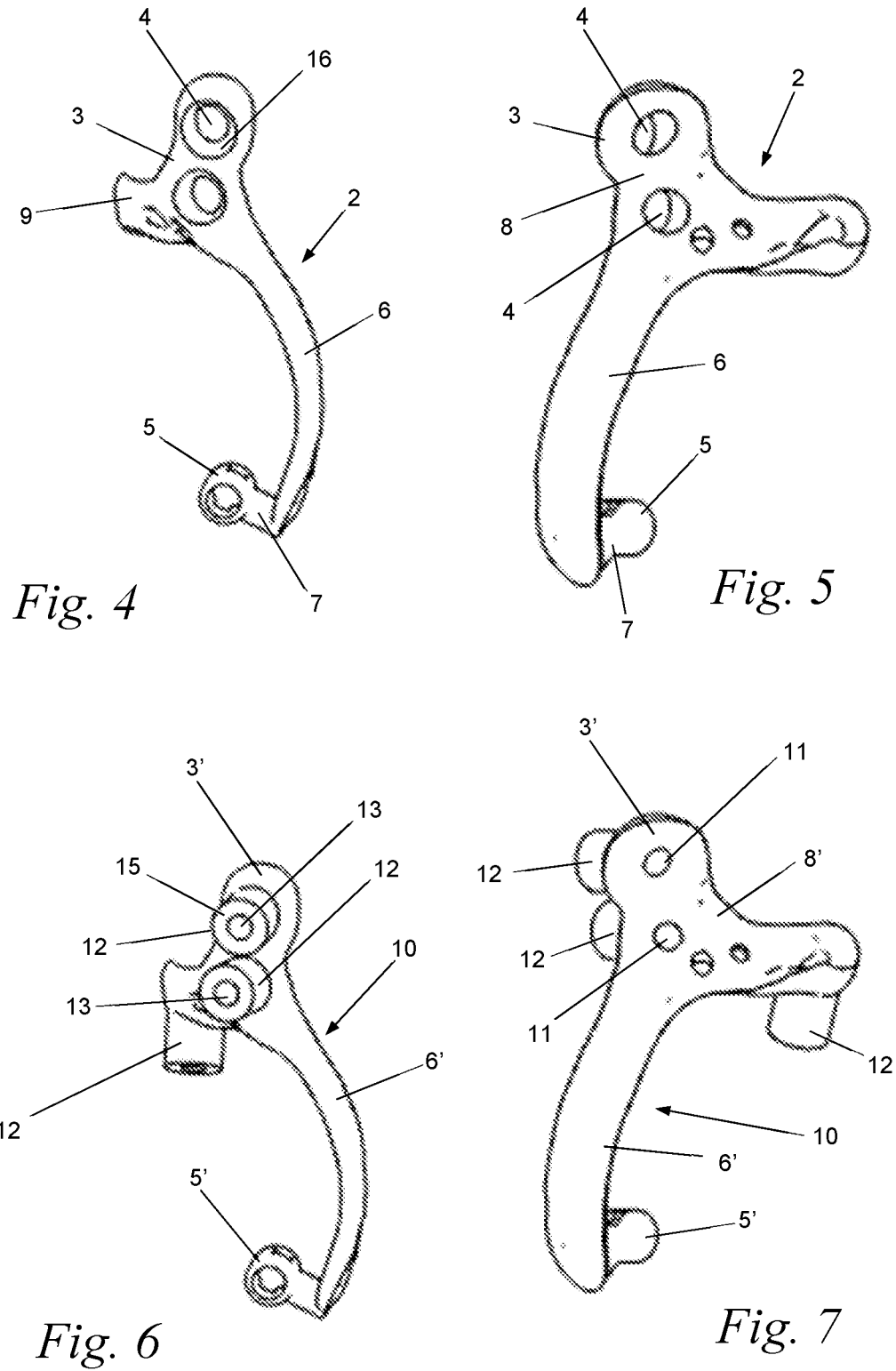
FIG. 4 is a schematic view in perspective of a bone anchor from FIG. 2 seen along the free side of the anchor plate.
FIG. 5 is a schematic view in perspective of the bone anchor from FIG. 4 seen along the bone side of the anchor plate.
FIG. 6 is a schematic view in perspective of a drilling template from FIG. 3 seen along the free side of the anchor plate.
FIG. 7 is a schematic view in perspective of the drilling template from FIG. 6 seen along the bone side of the anchor plate thereof.
Figures 8, 9, 10:
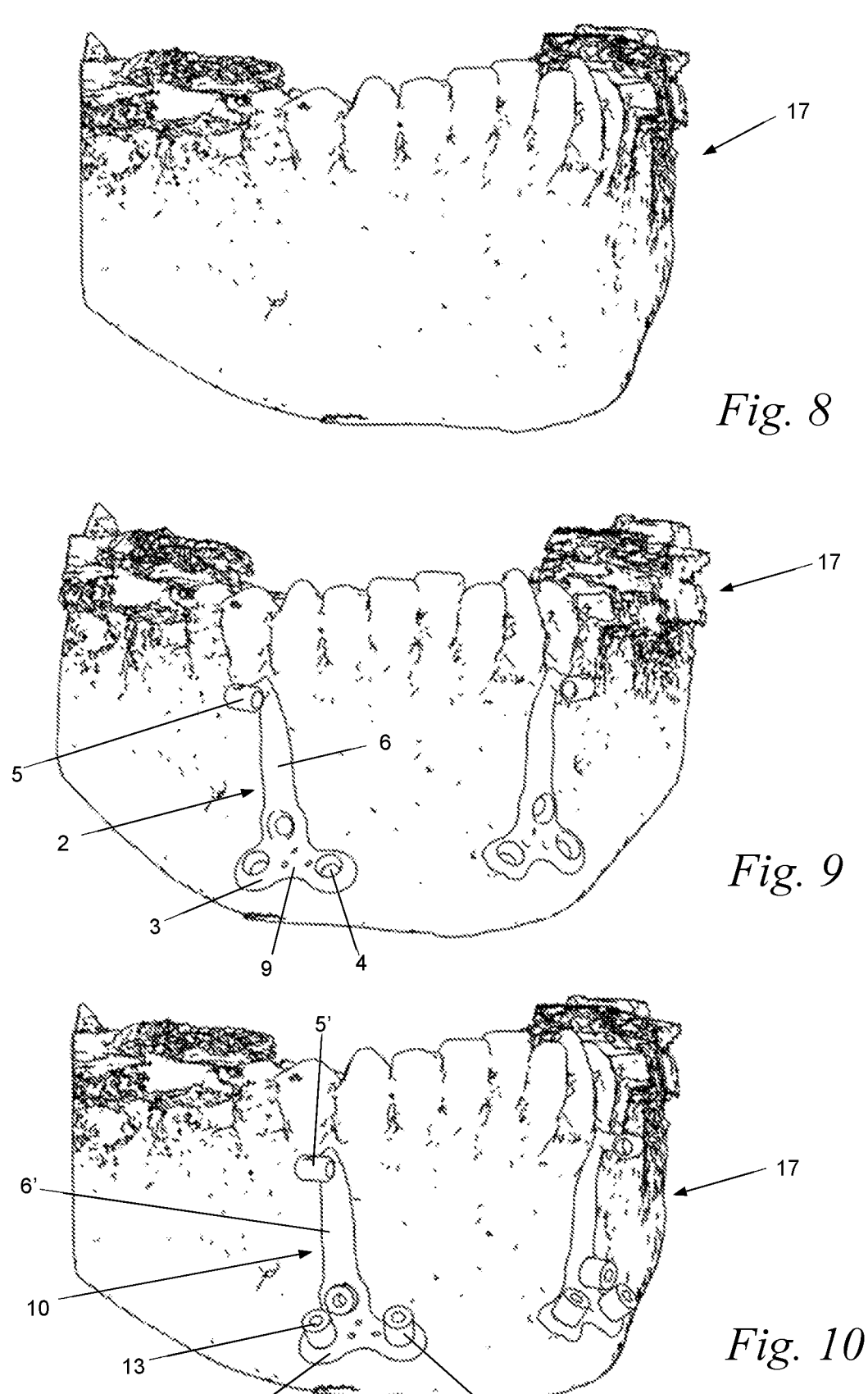
FIG. 8 is a schematic front view of a three-dimensional image or model of a part of a lower jaw.
FIG. 9 represents the view in FIG. 8, where a model for a bone anchor is added on the left side and on the right side of the lower jaw.
FIG. 10 represents the view in FIG. 8, where a model of a drilling template is added on the left side and on the right side of the lower jaw.
Figure 11:
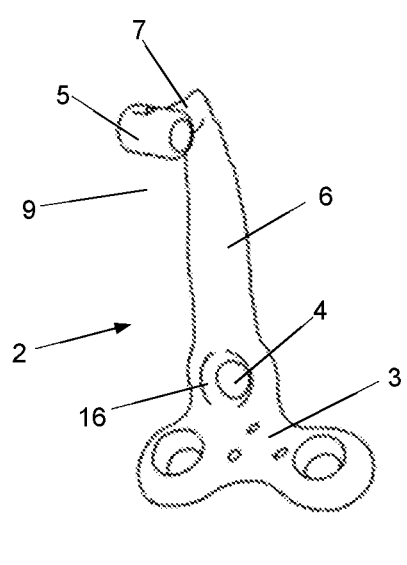
FIG. 11 is a schematic view in perspective of a bone anchor from FIG. 9 seen along the free side of the anchor plate.
Figure 12:
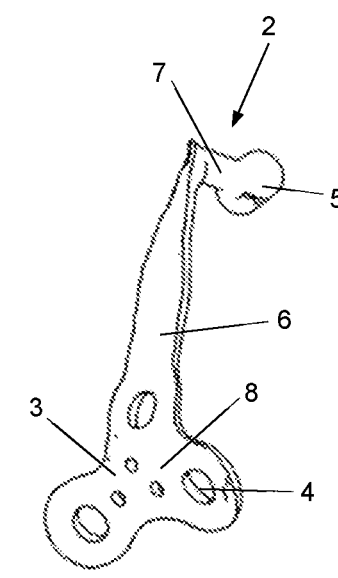
FIG. 12 is a schematic view in perspective of the bone anchor from FIG. 9 seen along the bone side of the anchor plate.
Figure 13:
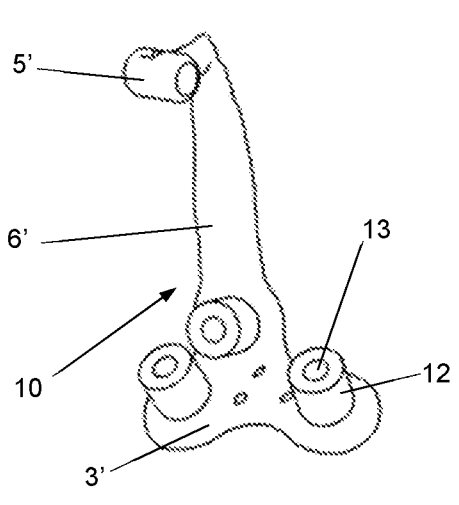
FIG. 13 is a schematic view in perspective of a drilling template from FIG. 10 seen along the free side of its anchor plate.
Figure 14:
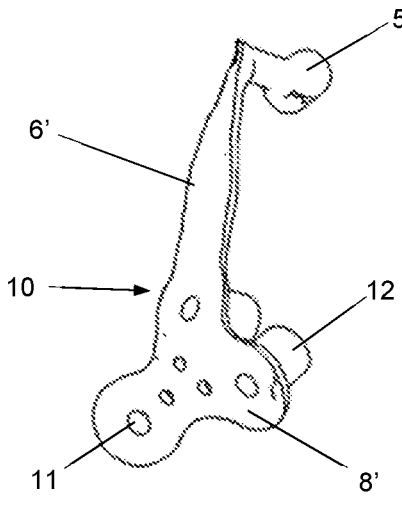
FIG. 14 is a schematic view in perspective of the drilling template from FIG. 10 seen along the bone side of the anchor plate.

FIGS. 4 and 5 show an example of a bone anchor 2. This bone anchor 2 contains an anchor plate 3 with openings 4 through which screws must be screwed in the jaw bone to fix the bone anchor 2 to the jaw. Furthermore, this bone anchor 2 has a mounting device 5 for mounting aids, in which an elongated connecting element 6 extends between the mounting device 5 and the anchor plate 3. This connecting element 6 is preferably also closely connected to the bone of the jaw 1 and is rigidly connected to the anchor plate 2.

When the bone anchor 2 is fixed to the jaw 1, the connecting element 6 should extend through the gingiva or mucosa into the oral cavity so that the mounting device 5 is in the oral cavity. The connecting element 6 preferably protrudes through solid gums, showing a circular cross-section 7 at the location where it protrudes through the gums.

Furthermore, the anchor plate 2 has a bone side 8 which has to be connected to the bone of the jaw 1 and an opposite free side 9.

The bone anchor 2 is individually designed for each patient, ensuring that the bone side 8 of the anchor plate 3 is almost flush with the bone of the patient's jaw. This not only allows the bone anchor to be firmly anchored to the jaw, but also has the advantage that the positioning of the bone anchor on the jaw bone can be done more precisely and is simplified for the surgeon.

In order to provide drill holes for said screws in the bone of the jaw 1 in a correct position and according to an exact orientation, a corresponding drilling template is designed and manufactured for the bone anchor 2.

The drilling template 10 for the bone anchor 2 from FIGS. 4 and 5 is shown in FIGS. 6 and 7. This drilling template 10 has recesses 11 whose mutual position corresponds to the mutual position of the aforementioned openings 4 in the bone anchor 2.

In addition, this drilling template 10 of FIGS. 6 and 7 has the same shape and dimensions as the bone anchor 2, at least on its bone side 8'. This means that the bone side 8' of the drilling template 10 also fits flush with the bone of the jaw 1. This makes it possible to position the drilling template with high accuracy on the jaw, whereby the drilling template 10 is in almost the same position as the planned position for the bone anchor 2. In addition, this offers the important advantage that the drilling template 10 takes up almost as much space as the bone anchor 2 to be placed.

This drilling template 10 also has a connecting element 6' similar to that of the bone anchor 2 and a 5' reference device corresponding to the mounting device 5 of the bone anchor 2. Thus, the presence of the connecting element 6' and the reference device 5', which extends into the oral cavity, contributes to a correct positioning of the drilling template 10 against the jaw.

In order to allow a drill to be guided, the drill template 10, adjacent to each of said recesses 11, has a drill guide 12. These drill guides 12 contain a cylindrical recess through which a drill can be inserted in a suitable manner in order to make drill holes in the jaw 1.

In order to design such a bone anchor, a three-dimensional digital model or a three-dimensional image of the jaw wherein the bone anchor is to be provided is generated. Such a model or image is obtained, for example, by performing a CT scan.

Figures 1, 2, 3:
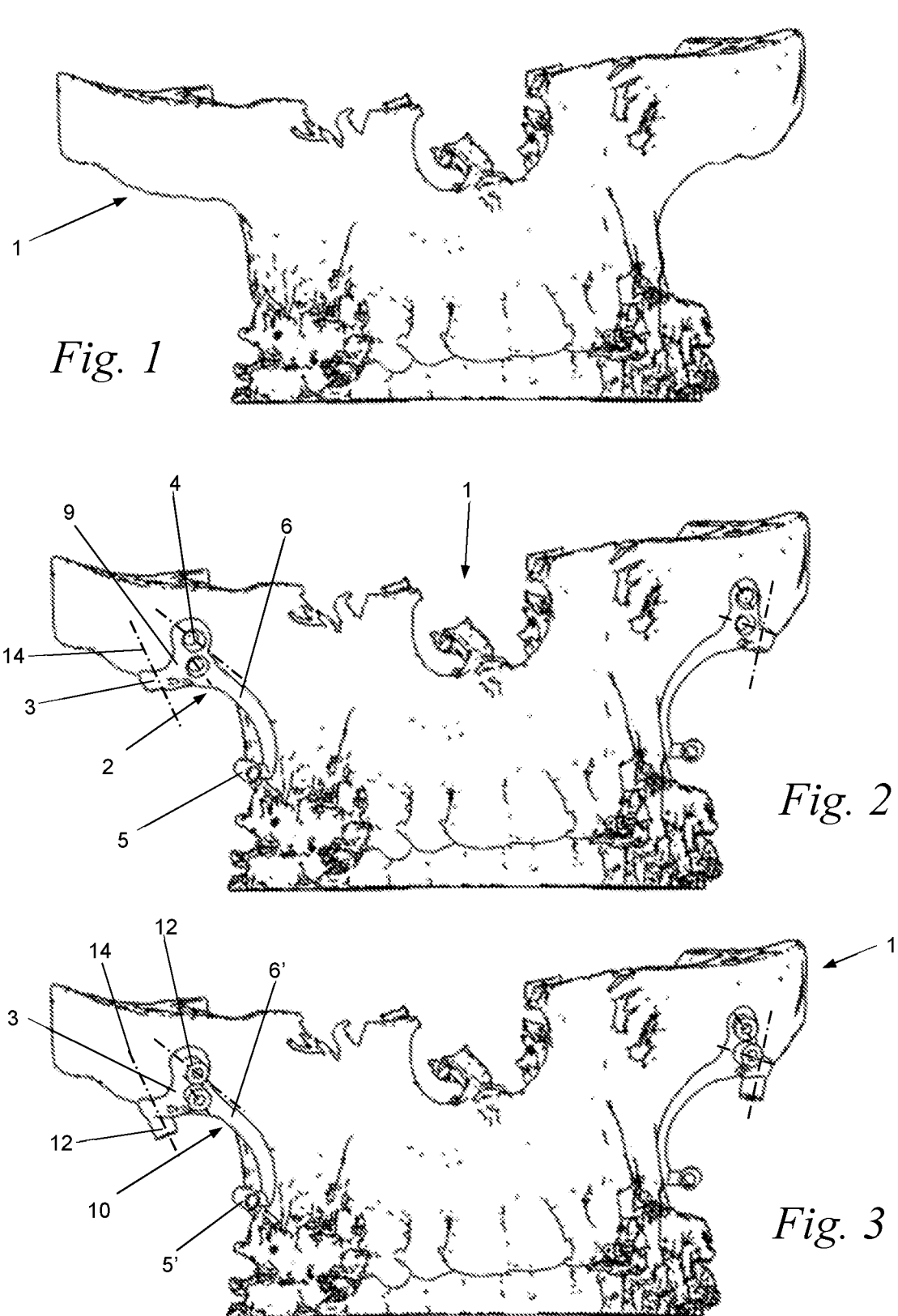
FIG. 1 is a schematic front view of a three-dimensional image or model of a part of an upper jaw.
FIG. 2 represents the view in FIG. 1, where a model for a bone anchor is added to the left side and to the right side of the upper jaw.
FIG. 3 represents the view in FIG. 1, where a model of a drilling template is added to the left side and to the right side of the upper jaw.

FIG. 1 schematically shows such an image of an upper jaw 1. For the design of the bone anchor 2, a position and orientation for each of the screws used to fix the bone anchor to the jaw is selected on the basis of this three-dimensional image. This position and orientation is chosen as a function of the structure and density of the bone of the jaw 1, whereby one chooses to place the screws in solid bone with a high density without, for example, touching nerve bundles.

Based on this choice of a position and orientation for the screws to be installed, a borehole for these screws is thus defined with a borehole axis 14, as shown schematically in FIG. 2.

Based on this three-dimensional digital image and the chosen position and orientation for the aforementioned screws, a digital model for the bone anchor 2 is designed. FIG. 2 thus shows a model for the bone anchor 2. For each of these screws, an opening 4 is provided in the anchor plate 3 of the model with an axis coinciding with said borehole axis 14 in order to allow the anchor plate 3 to be fixed to the bone of the jaw 1 by means of said screws through this hole 4 so that its bone side 8 connects to the surface of the bone.

The screws thus extend into the bone according to the chosen position and orientation.

In addition, a connection element 6 to the mounting device 5 is also provided on the model of the bone anchor 2 so that the mounting device 5 is located in the oral cavity when the anchor plate 3 is fixed to the bone of the jaw.

The model of the bone anchor 2 generated in this way can then be introduced into a machine for the additive manufacturing of the bone anchor 2 itself, for example by selective laser melting.

As shown schematically in FIG. 3, a digital model of the drilling template 10 associated with the bone anchor 2 is designed, starting from the model of the bone anchor 2, by adding a drilling guide 12 to the model for each of the openings 4 provided to the bone anchor 2 model. This drill guide 12 has a cylindrical recess 13 with a central axis for guiding a drill or a cutter. The borehole axis 14 for each of the screws coincides with the central axis of the corresponding cylindrical recess 13.

After the model of the drilling template 10 has been designed, it can be produced in the same way as the bone anchor 2.

Thus, the invention offers the advantage that a relatively compact drilling template 10 is obtained that takes up a negligible amount of extra space compared to the bone anchor 2, so that the placement of the drilling template in the limited space of the oral cavity against the jaw is no more complex than the placement of the bone anchor itself. In addition, the design of the drilling template requires virtually no additional effort or cost over and above the design of the bone anchor itself. The drilling template 10 and the bone anchor 2 can also be produced simultaneously by means of an additive manufacturing technique.

In order to reduce design and/or production costs, the bone anchor 2 and the drilling template 10 should preferably be made from the same material, such as for example titanium, and preferably by the same production technique.

According to an interesting embodiment of the invention, the cylindrical recesses 13 in the drilling template 10 are provided with a stop for a drill in order to allow drill holes to be made in said bone at a predetermined depth. This stop is formed, for example, by the flat end 15 of the drill guides 12.

According to an alternative embodiment of the bone anchor 2 according to the invention, it is manufactured on the basis of the drilling template 10. In particular, said drill guides 12 are removed from the drilling template 10 to obtain the bone anchor 2.

Preferably, the free side of the bone anchor has 9 conical recesses 16 that lead to the aforementioned openings 4. The dimensions of these conical recesses 16 are such that, when fixing the bone anchor 2 to the jaw bone, the heads of the screws sink at least partially, preferably entirely, into these recesses with respect to the free surface 9 of the anchor plate 3.

According to an interesting embodiment of the drilling template 10 according to the invention, it has the same recesses 16 as the bone anchor 2, wherein the heads of the screws must be fully sunk in these recesses 16 when attaching the bone anchor 2. The recesses 16 of the bone anchor therefore show a free part that is located above the screw head and that connects to the free side 9 of the anchor plate 3. In the drilling template 10, the drill guide 13 is attached to the corresponding free part. After removing the drill guides 13 from the template 10, they can thus be used as bone anchors. Any burrs or unevenness that may occur as a result of the removal of the drill guides are thus situated in the conical recesses 16 so that they are not disturbing.

FIGS. 8 to 14 show a lower jaw 17 and a bone anchor 2 and a drilling template 10 for a lower jaw 17. This bone anchor and this drilling template are similar to those for the upper jaw in FIGS. 1 to 7, except that they are specifically designed and adapted for the lower jaw 17 represented.

Of course, the invention is not limited to the embodiments of the bone anchor and the corresponding drilling template or of the method to produce them as described above and represented in the accompanying figures. Within the scope of the invention, several alternatives can be considered.

The invention claimed is:

1. A set comprising:

a bone anchor configured for mounting in bone of a jaw in an oral cavity, and a corresponding drilling template for making drill holes in the jaw for mounting the bone anchor to the bone of the jaw by screws, said bone anchor comprises:

an anchor plate provided with openings for said screws, a mounting device for mounting aids and configured to extend in the oral cavity, and a longitudinal connecting element that extends between the mounting device and the anchor plate and is rigidly connected to the anchor plate, whereas the connecting element is configured to extend through gingiva or mucosa into the oral cavity, wherein the anchor plate has a bone side which is configured to connect to said bone of the jaw and an opposite free side;

said drilling template has recesses having mutual positions corresponding to mutual positions of said openings of the bone anchor, wherein said drilling template contains an anchor plate with a bone side provided for connecting to the bone of the jaw, wherein at least a shape and dimensions of said bone side correspond to those of the bone side of the bone anchor's anchor plate, wherein the drilling template has a connecting element which is rigidly connected to the anchor plate thereof and whose shape and dimensions are the same as those of the connecting element of the bone anchor, and wherein said connecting element of the drilling template has the same orientation and position in relation to the anchor plate of the drilling template as the connecting element of the bone anchor in relation to the anchor plate of the bone anchor, wherein the set further comprises a plurality of drill guides, each of said plurality of drill guides is provided adjacent to each of said recesses on the drilling template allowing a drill to be guided in order to make said drill holes in the jaw.

2. The set according to claim 1, wherein one end of the connecting element of the drilling template, which is opposite to another end connected to the anchor plate of the drilling template, has a reference device whose shape and dimensions coincide with those of said mounting device, wherein a relative position of the reference device in relation to the anchor plate of the drilling template corresponds to a relative position of the mounting device in relation to the anchor plate of the bone anchor.

3. The set according to claim 1, wherein said free side of the anchor plate of the bone anchor has conical recesses leading to said openings in such a way that, when the bone anchor is mounted and fixed to said bone by said screws, heads of said screws can be sunk at least partially in the conical recesses in relation to the free side of the anchor plate.

4. The set according to claim 1, wherein said recesses of the drilling template each has a circular cross section with a central axis, and said plurality of drill guides each has a cylindrical recess with a central axis coinciding with the central axis of the circular cross section of the respective adjacent recess on the drilling template.

5. The set according to claim 4, wherein said cylindrical recess has a stop for making the drill holes in said bone with a predetermined depth.

6. The set according to claim 1, wherein said plurality of drill guides can be removed from said drilling template in order to transform said drilling template into said bone anchor.

7. A method for manufacturing a bone anchor and a corresponding drilling template for a jaw in an oral cavity, the jaw having a bone presenting a surface, the method comprises:

designing a model of the bone anchor based on a three-dimensional digital model of the bone of the jaw, wherein the bone anchor has an anchor plate configured to be fixed to the surface of the bone of the jaw with one or more screws, wherein the anchor plate has a bone side that is configured to connect to the surface of the bone and has a free side opposite said bone side, wherein said bone anchor further has a longitudinal connecting element that extends between a mounting device and the anchor plate and is rigidly connected to the anchor plate, whereas said connecting element is configured to extend through gingiva or mucosa into the oral cavity so that the mounting device is situated in the oral cavity, selecting, based on the model of the bone of the jaw, a position and orientation for each of the one or more screws as a function of structure and density of the bone, the selected position and orientation thus defining a borehole with a borehole axis for said each of the one or more screws, and providing, in the model of the bone anchor, openings in the anchor plate, each of said openings corresponds to the selected position and orientation for said each of the one or more screws;

introducing the model of the bone anchor into a machine for additive manufacturing of the bone anchor, designing a model of said drilling template based on the model of said bone anchor so that the drilling template contains an anchor plate whose shape and dimensions of at least a bone side thereof correspond to those of the anchor plate of the bone anchor and so that the drilling template has a connecting element which is rigidly connected to the anchor plate of the drilling template and whose shape and dimensions are the same as those of the connecting element of the bone anchor, to which are added drill guides each having a cylindrical recess with a central axis coinciding with said borehole axis for guiding a drill, introducing the model of the drilling template into the machine for additive manufacturing of the drilling template, manufacturing said bone anchor based on said model of the bone anchor and manufacturing said drilling template by an additive manufacturing technique based on said model of the drilling template.

8. The method according to claim 7, wherein said each of the openings in the anchor plate has an axis coinciding with said borehole axis in order to allow the anchor plate to be fixed to said bone with said one or more screws so that the bone side connects to the surface of the bone, with said one or more screws extending into the bone according to the selected position and orientation wherein, after designing the model of the drilling template and the model for the bone anchor, the drilling template and the bone anchor are produced on the basis of the models.

9. The method according to claim 7, wherein said cylindrical recess is provided with a stop for a drill allowing to make drill holes in said bone with a predetermined depth.

10. The method according to claim 7, further comprising taking a cone beam CT scan of said jaw to generate said three-dimensional model of the bone of the jaw.

11. The method according to claim 7, wherein said bone anchor is manufactured by removing said drill guides from the drilling template.

* * * * *